United States Patent
Tanaka

(10) Patent No.: US 12,319,118 B2
(45) Date of Patent: Jun. 3, 2025

(54) AIR-CONDITIONING APPARATUS

(71) Applicant: Mitsubishi Electric Corporation, Tokyo (JP)

(72) Inventor: Tetsuya Tanaka, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 248 days.

(21) Appl. No.: 18/181,749

(22) Filed: Mar. 10, 2023

(65) Prior Publication Data

US 2023/0382182 A1 Nov. 30, 2023

(30) Foreign Application Priority Data

May 25, 2022 (JP) .................. 2022-085456

(51) Int. Cl.
*B60H 1/00* (2006.01)
*B61D 17/12* (2006.01)
*B61D 27/00* (2006.01)

(52) U.S. Cl.
CPC ..... *B60H 1/00371* (2013.01); *B60H 1/00207* (2013.01); *B60H 1/00385* (2013.01); *B60H 1/00428* (2013.01); *B61D 17/12* (2013.01); *B61D 27/0018* (2013.01); *B60H 2001/00235* (2013.01); *B60H 1/00535* (2013.01)

(58) Field of Classification Search
CPC ............ B60H 1/00371; B60H 1/00207; B60H 1/00385; B60H 1/00428; B60H 17/12; B60H 27/0018; B60H 1/00535; B60H 2001/00235
See application file for complete search history.

(56) References Cited

U.S. PATENT DOCUMENTS 7,049,707 B2 * 5/2006 Wurtele ............. B60H 1/00378
290/1 R
11,198,345 B2 * 12/2021 Gotmalm ........... B60H 1/00428
(Continued)

FOREIGN PATENT DOCUMENTS

JP S5624317 U 3/1981
JP S6430874 A 2/1989
(Continued)

OTHER PUBLICATIONS

Notice of Reasons for Refusal dated Mar. 18, 2025, issued in the corresponding Japanese Patent Application No. 2022-085456, 10 pages including 5 pages of English Translation.

*Primary Examiner* — Ljiljana V. Ciric
(74) *Attorney, Agent, or Firm* — BUCHANAN, INGERSOLL & ROONEY PC

(57) ABSTRACT

An air-conditioning apparatus includes a casing to store a device included in the air-conditioning apparatus, and an access door pivotably supported by the casing via a hinge so as to be pulled downward of the casing to allow access from inside a compartment of the railway vehicle to the device in the casing. A control device to control the air-conditioning apparatus and an inverter device to supply an operational electric current to the air-conditioning apparatus are mounted on a surface of the access door on a side facing an interior space of the casing. Main circuit wiring for supply of power and control wiring for sending and receiving of a control signal are disposed apart from each other, with the access door between the main circuit wiring and the control wiring.

6 Claims, 9 Drawing Sheets

(56) References Cited

U.S. PATENT DOCUMENTS

| | | | |
|---|---|---|---|
| 11,761,647 B2 * | 9/2023 | Baverstock | F28D 7/0008 |
| | | | 62/3.2 |
| 2011/0000710 A1 | 1/2011 | Bravo et al. | |
| 2021/0376751 A1 | 12/2021 | Hayashi | |
| 2022/0009305 A1 | 1/2022 | Henderson et al. | |
| 2022/0144038 A1 * | 5/2022 | Fillenwarth | A61L 9/20 |
| 2023/0382182 A1 * | 11/2023 | Tanaka | B60H 1/00385 |

FOREIGN PATENT DOCUMENTS

| | | |
|---|---|---|
| JP | 2009-296799 A | 12/2009 |
| JP | 2019-130993 A | 8/2019 |
| JP | 2020072587 A | 5/2020 |

\* cited by examiner

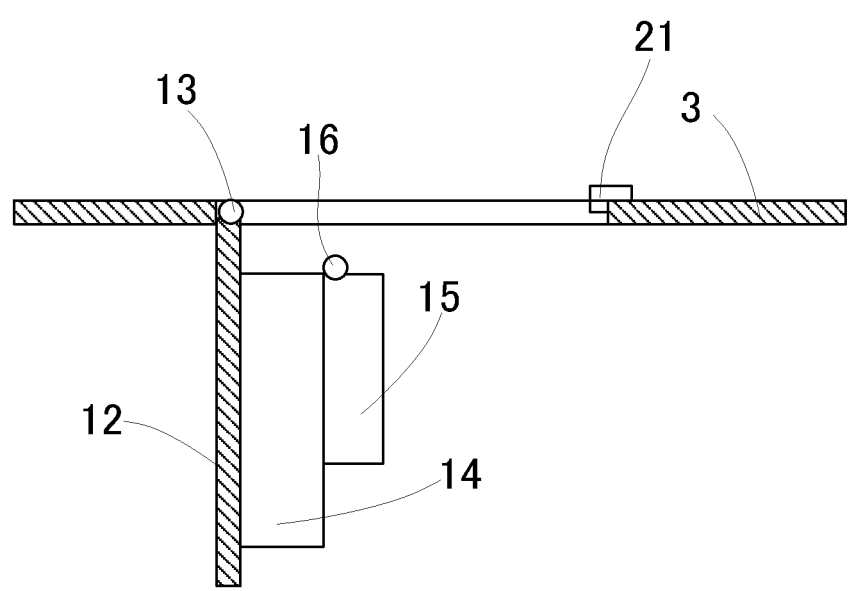

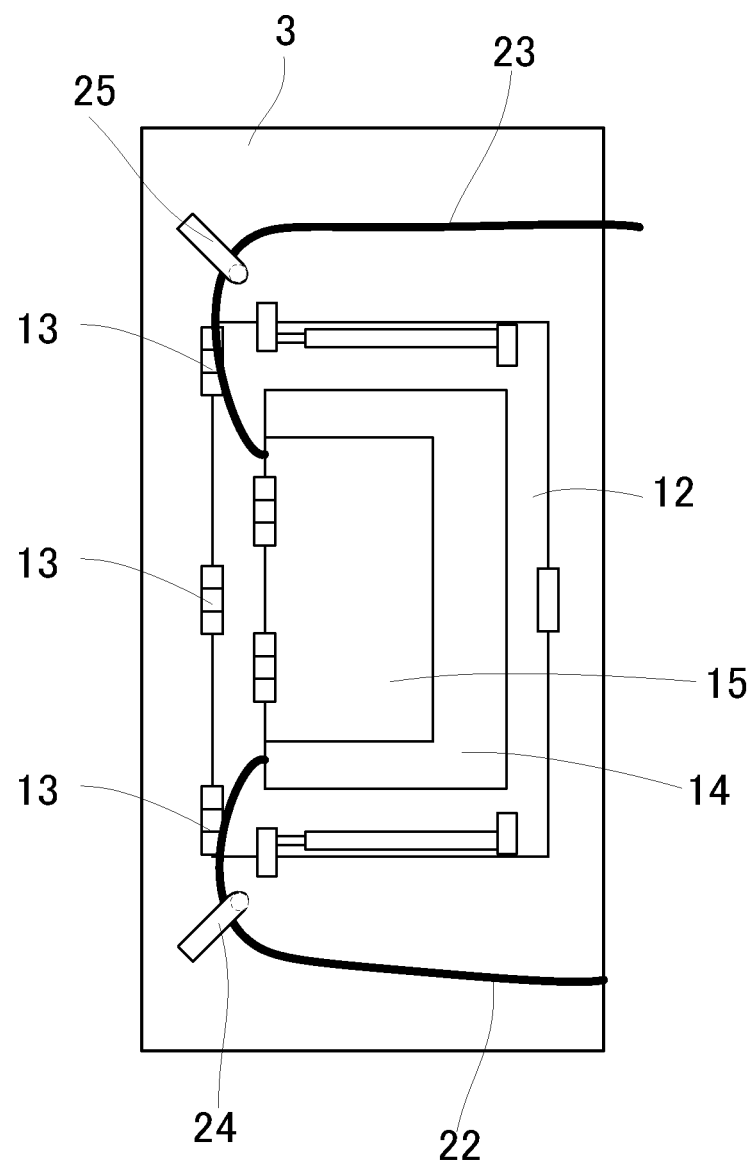

AIR-CONDITIONING APPARATUS

CROSS-REFERENCE TO RELATED APPLICATIONS

This application claims the benefit of Japanese Patent Application No. 2022-085456, filed on May 25, 2022, the entire disclosure of which is incorporated by reference herein.

FIELD OF THE INVENTION

The present disclosure relates to an air-conditioning apparatus.

BACKGROUND OF THE INVENTION

An air-conditioning apparatus mounted on a roof of a railway vehicle is known. For example, an air-conditioning apparatus disclosed in Unexamined Japanese Patent Application Publication No. S64-30874 includes an indoor unit, an outdoor unit, and electrical items including an inverter, a microcomputer, and a controller, all of which are mounted on a roof of a railway vehicle. Also, the air-conditioning apparatus disclosed in the Patent Literature further includes a cover for protecting the indoor unit, the outdoor unit, and the electrical items from wind and rain.

The railway vehicle includes, on the roof on which the air-conditioning apparatus disclosed in the Patent Literature is to be mounted, an air supply opening for supply of air in a compartment of the vehicle to the indoor unit and a discharge opening for discharge of air passing through the indoor unit toward the compartment. The Patent Literature also discloses that positioning of the electrical items above the air supply opening can provide access to the electrical items from the compartment side of the railway vehicle through the air supply opening to perform maintenance of the electrical items.

SUMMARY OF THE INVENTION

However, in a case of performing the maintenance of the electrical items in the air-conditioning apparatus disclosed in the Patent Literature, a worker needs to conduct work in a narrow space since the electrical items are fixed to a frame. Alternatively, the worker is to remove the electrical items from the frame and take the electrical items down out of the vehicle from the roof side of the vehicle to conduct work. Thus, the air-conditioning apparatus disclosed in the Patent Literature needs time and effort for the maintenance of the electrical items.

In view of the above circumstances, an objective of the present disclosure is to provide an air-conditioning apparatus to be mounted on a roof of a railway vehicle, with easier maintenance of electrical items.

An air-conditioning apparatus according to the present disclosure is mounted on a roof of a railway vehicle, and includes a casing to store a device included in the air-conditioning apparatus, and an access door pivotably supported by the casing via a hinge to allow access from inside a compartment of the railway vehicle to the device in the casing. A control device to control the air-conditioning apparatus and an inverter device that is controlled by the control device to supply an operational electric current to the air-conditioning apparatus are mounted on a surface of the access door on a side facing an interior space of the casing. Main circuit wiring connected to the inverter device and configured for supplying of power and control wiring connected to the control device and configured for sending and receiving of a control signal are disposed apart in the casing, with the access door between the main circuit wiring and the control wiring.

According to the disclosure, since the control device and the inverter device are mounted on the surface of the access door on the side facing the interior space of the casing to allow access from inside the compartment of the railway vehicle to the device in the casing, the control device and the inverter device can be pulled out of the casing by opening of the access door. This results in easy access to the control device and the inverter device, thereby facilitating maintenance work performed on the control device and the inverter device. Also, disposing the main circuit wiring and the control wiring apart with the access door therebetween can eliminate the need for noise countermeasures for the control wiring. Specifically, such arrangement can eliminate the need for passing the control wiring through a ferrite core. Thus, bending or extending of the control wiring is not restricted by the ferrite cores.

BRIEF DESCRIPTION OF DRAWINGS

A more complete understanding of this application can be obtained when the following detailed description is considered in conjunction with the following drawings, in which:

FIG. 3B is an explanatory diagram illustrating the access door in an open position;

FIG. 6 is an explanatory diagram illustrating arrangement of electrical wires in a casing included in the air-conditioning apparatus illustrated in FIG. 1A.

DETAILED DESCRIPTION OF THE INVENTION

Figure 1A:
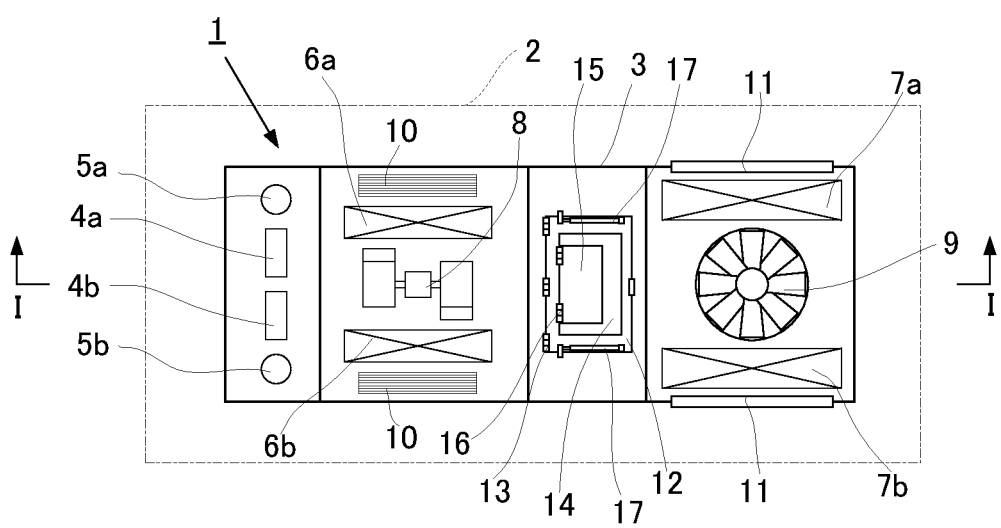
FIG. 1A is a plan view of an air-conditioning apparatus according to an embodiment of the present disclosure.

A configuration and operation of an air-conditioning apparatus according to an embodiment of the present disclosure are described in detail with reference to the drawings. The same reference numerals are used for the same or similar components throughout the drawings.

Figure 1B:
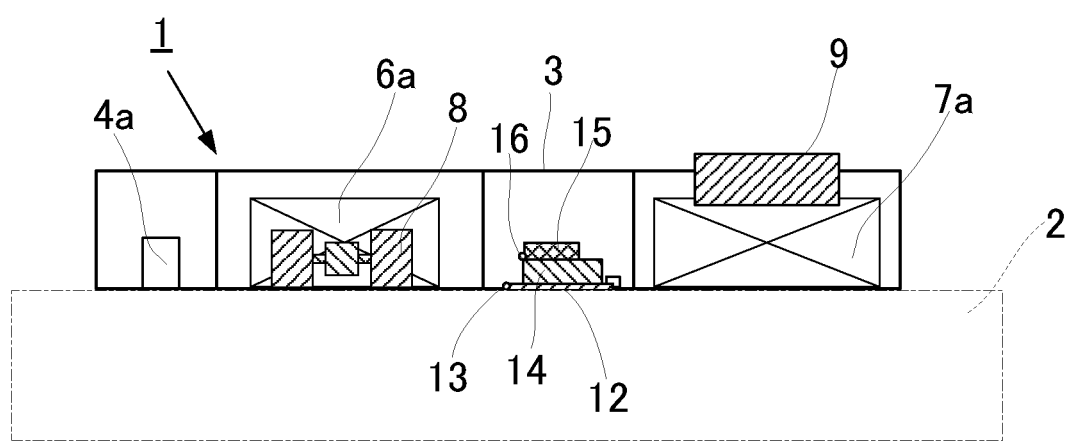
FIG. 1B is a cross-sectional view of the air-conditioning apparatus, taken along a plane indicated by lines I-I in FIG. 1A.

FIGS. 1A and 1B are explanatory diagrams illustrating a configuration of an air-conditioning apparatus 1 according to an embodiment of the present disclosure. FIG. 1A is a plan view of the air-conditioning apparatus 1, and FIG. 1B is a cross-sectional view of the air-conditioning apparatus 1 taken along a plane indicated by lines I-I in FIG. 1A.

As illustrated in FIGS. 1A and 1B, the air-conditioning apparatus 1 is mounted on a roof of a railway vehicle 2. The air-conditioning apparatus 1 includes a casing 3 for protecting components described later of the air-conditioning apparatus 1 from wind and rain. FIG. 1A illustrates the casing 3 with a top removed.

As illustrated in FIG. 1A, the air-conditioning apparatus 1 includes compressors 4a and 4b, expansion valves 5a and 5b, indoor-unit-side heat exchangers 6a and 6b, and outdoor-unit-side heat exchangers 7a and 7b. The compressor 4a, the expansion valve 5a, the indoor-unit-side heat exchange 6a, and the outdoor-unit-side heat exchange 7a are connected through piping and a four-way valve, which are not illustrated, to constitute a refrigeration cycle in which refrigerant circulates, and the compressor 4b, the expansion valve 5b, the indoor-unit-side heat exchanger 6b, and the outdoor-unit-side heat exchanger 7b are also connected through piping and a four-way valve, which are not illustrated, to constitute a refrigeration cycle in which refrigerant circulates. This means that the air-conditioning apparatus 1 is equipped for two refrigeration cycles. The four-way valve is a valve that switches a direction of a refrigerant flow in the refrigeration cycle.

The air-conditioning apparatus 1 functions as a cooling machine or a heating machine via operation of the four-way valve to switch the direction of the refrigerant flow in the refrigeration cycle. When the air-conditioning apparatus 1 functions as the cooling machine, the indoor-unit-side heat exchanges 6a and 6b function as heat absorbers to absorb the heat carried by indoor air into the refrigerant, and the outdoor-unit-side heat exchangers 7a and 7b function as heat dissipaters to dissipate the heat carried by the refrigerant outside the vehicle. When the air-conditioning apparatus 1 functions as the heating machine, the indoor-unit-side heat exchangers 6a and 6b function as the heat dissipaters to dissipate the heat carried by the refrigerant into the indoor air, and the outdoor-unit-side heat exchangers 7a and 7b function as heat absorbers to absorb the heat carried by air outside the vehicle into the refrigerant.

As illustrated in FIGS. 1A and 1B, the air-conditioning apparatus 1 includes an indoor-unit-side blower 8 and an outdoor-unit-side blower 9. The indoor-unit-side blower 8 is a blower that sucks in air from the compartment of the railway vehicle 2 and delivers the air toward the indoor-unit-side heat exchangers 6a and 6b. The air delivered to the indoor-unit-side heat exchangers 6a and 6b is cooled or heated while passing through the indoor-unit-side heat exchangers 6a and 6b. Then the air having passed through the indoor-unit-side heat exchangers 6a and 6b is discharged through a discharge port 10 into the compartment of the railway vehicle 2. The outdoor-unit-side blower 9 is a blower that sucks in air from the outside of the railway vehicle 2 and delivers the air toward the outdoor-unit-side heat exchangers 7a and 7b. The air delivered to the outdoor-unit-side heat exchangers 7a and 7b is cooled or heated while passing through the outdoor-unit-side heat exchangers 7a and 7b. Then the air having passed through the outdoor-unit-side heat exchangers 7a and 7b is discharged through an exhaust port 11 outside the railway vehicle 2.

As illustrated in FIGS. 1A and 1B, the air-conditioning apparatus 1 further includes, on the bottom side of the casing 3, an access door 12 that allows access from the compartment of the railway vehicle 2 to the interior of the air-conditioning apparatus 1. The access door 12 is supported by the casing 3 via a hinge 13. Thus, as described later, the access door 12 can be opened by movement of the access door 12 pivotally around the hinge 13 to pull the access door 12 downward of the casing 3. The railway vehicle 2 includes a non-illustrated opening that allows access to the access door 12. Thus opening of the access door 12 is enabled by accessing the access door 12 from the compartment of the railway vehicle 2.

On a side of the access door 12 facing an interior space of the casing 3, that is, on an upper surface of the access door 12 in FIG. 1B, an inverter device 14 is fixedly mounted to the access door 12. A control device 15 is mounted on the upper surface of the inverter device 14 and coupled to the inverter device 14 via the hinge 16. The hinge 16 couples an end portion on the hinge 13 side of the upper surface of the inverter device 14 to an end portion on the hinge 13 side of the lower surface of the control device 15. The upper surface of the inverter device 14 and the lower surface of the control device 15 are configured to be flat and parallel to each other. Side surfaces on the hinge 13 side of the inverter device 14 and the control device 15 are configured to be flat and perpendicular to the upper surface of the access door 12. As illustrated in FIG. 1A, the inverter device 14 is configured to be smaller than the access door 12 in the plan view, and the control device 15 is configured to be smaller than the inverter device 14 in the plan view. As illustrated in FIG. 1A, a damper 17 bridges between the casing 3 and the access door 12. The specific configuration and operation of the damper 17 are described later.

Figure 2:
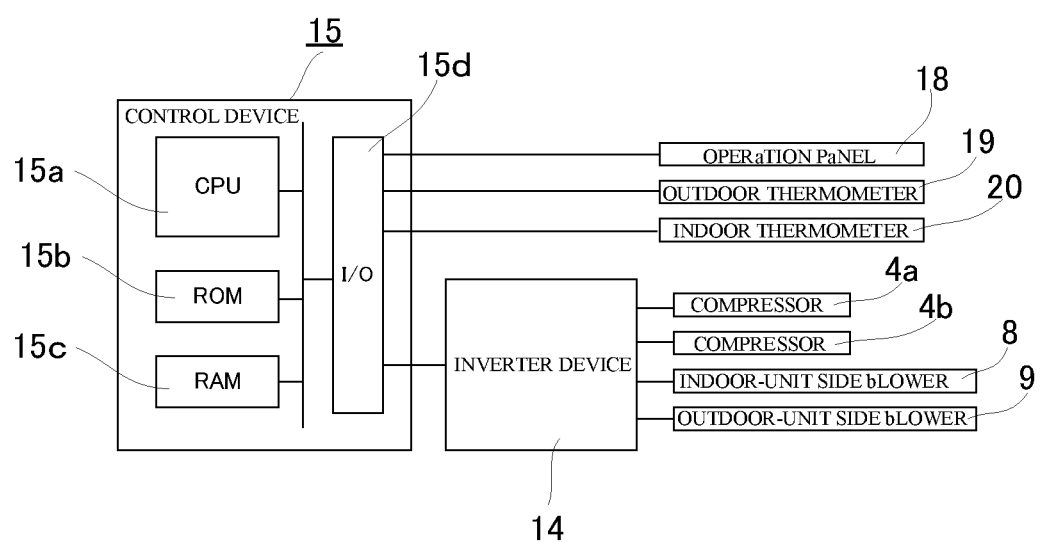
FIG. 2 is a block diagram illustrating a configuration and functions of a control device and an inverter device included in the air-conditioning apparatus illustrated in FIG. 1A.

Next, the configuration and function of the control device 15 and the inverter device 14 are described. FIG. 2 is a block diagram illustrating the configuration and function of the control device 15 and the inverter device 14. As illustrated in FIG. 2, the control device 15 is a computer that includes a central processing unit (CPU) 15a, a read only memory (ROM) 15b, a random access memory (RAM) 5c, and an input/output (I/O) interface 15d.

The ROM 15b is a storage device that stores a program to be executed by the CPU 15a. The RAM 15c is a storage device that functions as a work area for the CPU 15a. The I/O interface 15d is a device for processing of input and output between an external device and the CPU 15a.

The CPU 15a reads the program stored in the ROM 15b and executes the program. Then the CPU 15a outputs the result via the I/O interface 15d to the external device.

As illustrated in FIG. 2, an operation panel 18, an outdoor thermometer 19, an indoor thermometer 20, and the inverter device 14 are connected to the control device 15. The operation panel 18 is a device, disposed inside the railway vehicle 2 (not illustrated in FIG. 2), for operation input by a crewmember for the air-conditioning apparatus 1 (not illustrated in FIG. 2). The outdoor thermometer 19 is a device that measures temperature of the outside air of the railway vehicle 2 and outputs the result. The indoor thermometer 20 is a device that measures temperature of the inside air of the railway vehicle 2 and outputs the result. The inverter device 14 is a device that is controlled by the control device 15 to supply operational electric current to motors for driving the compressors 4a and 4b, the indoor-unit-side blower 8, and the outdoor-unit-side blower 9 and change frequencies of the operational electric current, that is, change the operational frequencies. Such changing of the operational frequencies causes change in rotational speeds of these motors.

With such configurations, the control device 15 and the inverter device 14 can adjust the operation speeds of the compressors 4a and 4b, the indoor-unit-side blower 8, and the outdoor-unit-side blower 9 in accordance with the operation input in the operation panel 18, the temperature of the external air of the railway vehicle 2 measured by the outdoor thermometer 19, and the temperature of the indoor air of the railway vehicle 2 measured by the indoor thermometer 20.

Figure 3A:
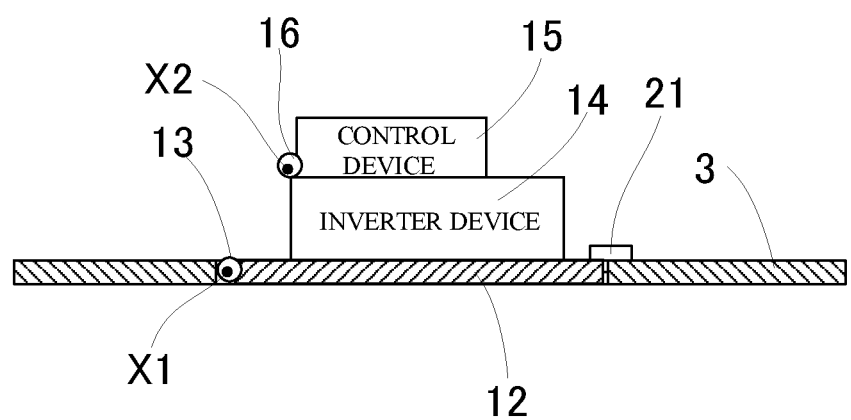
FIG. 3A is an explanatory diagram illustrating an access door, included in the air-conditioning apparatus illustrated in FIG. 1A, in a closed position.
Figure 3C:
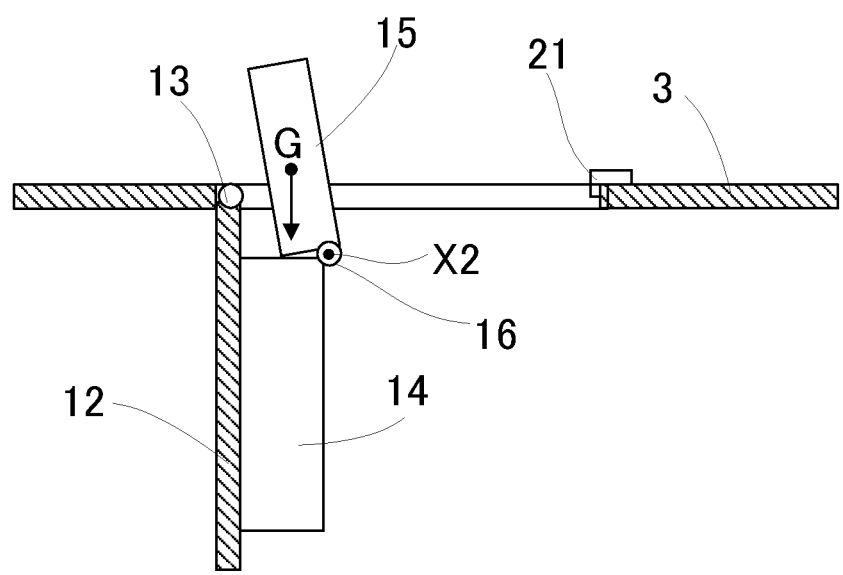
FIG. 3C is an explanatory diagram illustrating the control device mounted on the access door, with the control device moved pivotally around a hinge.

Next, operation of the access door 12 is described with reference to FIGS. 3A to 3C. FIG. 3A is an explanatory diagram illustrating the access door 12 in a closed position, and FIG. 3B is an explanatory diagram illustrating the access door 12 in an open position. FIG. 3C is an explanatory diagram illustrating the control device 15 moved pivotally around the hinge 16.

In normal operation of the railway vehicle 2 (not illustrated in FIG. 3A), the access door 12 is closed as illustrated in FIG. 3A. A latch 21 is provided between the casing 3 and the access door 12 and the closed state of the access door 12 is maintained by the latch 21. In the closed state of the access door 12, the control device 15 and the inverter device 14 are stored inside the casing 3. The hinges 13 and 16 pivotally move around rotational axes X1 and X2 perpendicular to the drawing sheet in FIG. 3A.

Disengaging the access door 12 from the latch 21 in the state illustrated in FIG. 3A can move the access door 12 pivotally around the hinge 13, as illustrated in FIG. 3B, to pull the access door 12 downward of the casing 3. As a result, access to the interior of the casing from downward of the casing 3 is available. Also, the inverter device 14 and the control device 15 are pulled out of the casing 3.

As described above, the control device 15 is coupled to the inverter device 14 via the hinge 16. The control device 15 engages the inverter device 14 via a non-illustrated latch. Disengaging the control device 15 from the latch in the state of FIG. 3B can move the control device 15 pivotally around the hinge 16, as illustrated in FIG. 3C, and bring the control device upward. This results in easy access to each of the inverter device 14 and the control device thereby facilitating maintenance work of the inverter device 14 and the control device 15.

As illustrated in FIG. 3C, with the control device 15 brought up until the center of gravity of the control device 15 passes through the rotational axis X2 to a position closer to the hinge 13, an overturning moment occurring around the rotational axis X2 by gravity acting on the center of gravity G acts in a direction in which the control device 15 moves down toward the backside, that is, toward the hinge 13 side. This prevents the control device 15 from moving back down toward the front side.

Figure 4:
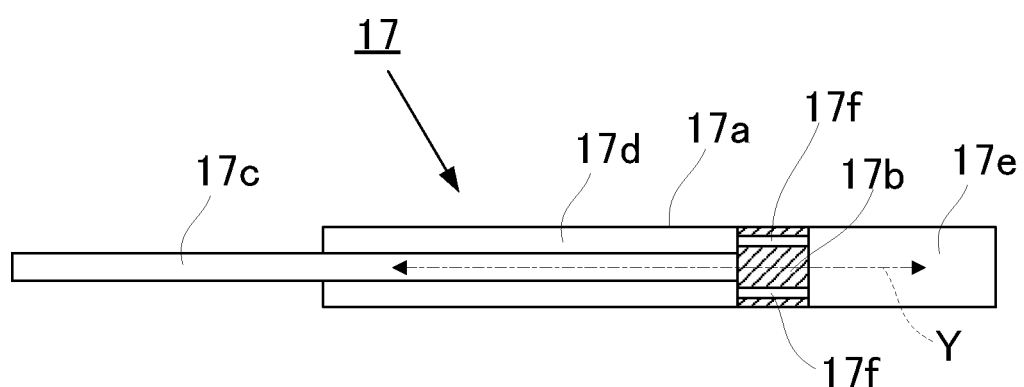
FIG. 4 is a cross-sectional view illustrating a configuration of a damper included in the air-conditioning apparatus illustrated in FIG. 1A.

Next, a configuration and action of the damper 17 is described with reference to FIGS. 4 and 5. FIG. 4 is a cross-sectional view illustrating a configuration of the damper 17 and FIG. 5 is an explanatory diagram illustrating the action of the damper 17.

As illustrated in FIG. 4, the damper 17 includes a cylinder 17a, a piston 17b that is inserted in the cylinder 17a and advances and retreats in the cylinder 17a in a lengthwise direction of the cylinder 17a, that is, in an advance/retreat axial direction denoted by reference numeral Y in FIG. 4, and a piston rod 17c that is fixed to the piston 17b and advances and retreats relative to the cylinder 17a together with the piston 17b. Internal spaces 17d and 17e of the cylinder 17a are filled with viscous fluid. The piston 17b includes a fluid passage 17f, and when the piston 17b advances and retreats in the cylinder 17a, the viscous fluid moves through the fluid passage 17f between the space 17d and the space 17e. When the viscous fluid flows in the fluid passage 17f, resistance of the viscous fluid acting on the piston 17b hinders movement of the piston 17b and reduces the speed of the piston 17b.

Figure 5:
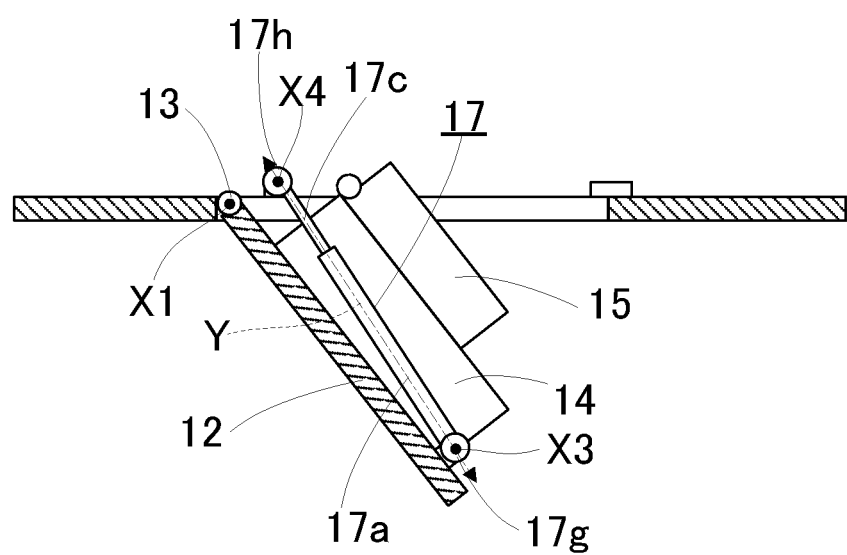
FIG. 5 is an explanatory diagram illustrating action by the damper.

As illustrated in FIG. 5, an end of the cylinder 17a of the damper 17 is coupled to the access door 12 via a hinge 17g.

An end of the piston rod 17c of the damper 17 is coupled to the casing 3 via a hinge 17h. The hinge 17g and the hinge 17h move pivotally around rotational axes X3 and X4 perpendicular to the drawing sheet in FIG. 5. The hinge 17g and the hinge 17h are fixed in positions apart from the hinge 13. The distance between the hinge 13 and the hinge 17g is greater than the distance between the hinge 13 and the hinge 17h. The piston rod 17c of the damper 17 advances and retreats in an advance/retreat axis Y direction perpendicular to the rotational axes X1, X3, and X4. Thus, moving the access door 12 pivotally around the hinge 13 to pull the access door 12 downward increases the distance between the hinge 17h and the hinge 17g and thus pulls the piston rod 17c from the cylinder 17a. As described above, since the speed at which the piston rod 17c is pulled from the cylinder 17a is reduced by resistance of the viscous fluid, the damper 17 functions as a brake that hinders pivotal movement of the access door 12. The damper 17 also functions as a brake that hinders pivotal movement of the access door 12 when bringing the access door 12 up to return the access door 12 to the closed position. In this way, inclusion of the damper 17 between the access door 12 and the casing 3 suppress the rotational speed at opening and closing of the access door 12, thereby ensuring the safety of the worker. Since the magnitude of the resistance of the damper 17 acting on the access door 12 is proportional to the speed of the access door 12, the access door 12 is not subject to great resistance in a case of low-speed pivotal movement of the access door 12.

Although the arrangement of the damper 17 is not particularly limiting, structural stability can be provided by including two dampers 17 and disposing the inverter device 14 and the control device 15 between the two dampers 17 as illustrated in FIG. 1A.

As illustrated in FIG. 2, the control device 15 is connected to the external devices. The inverter device 14 is connected to the compressors 4a and 4b, the indoor-unit-side blower 8, and the outdoor-unit-side blower 9. The wiring between the control device 15 and the external devices is control wiring for sending and receiving of a control signal and needs to be protected from noise. The wiring between the inverter device 14 and the compressors 4a and 4b, the indoor-unit-side blower 8, and the outdoor-unit-side blower 9 is the main circuit wiring for supply of power and could be a source of noise. Thus, the main circuit wiring is desirably disposed apart from the control wiring. Also, wiring for the inverter device 14 to receive supply of power is also connected to the inverter device 14. Since this wiring is included in the main circuit wiring, disposing this wiring apart from the control wiring is desirable.

In view of the circumstances, as illustrated in FIG. 6, the main circuit wiring and the control wiring are disposed apart from each other in the present embodiment. FIG. 6 is an explanatory diagram illustrating arrangement of the electrical wires in the casing 3.

As illustrated in FIG. 6, a main circuit wiring bundle 22 and a control wiring bundle 23 are disposed apart from each other in the casing 3, with the access door 12 therebetween. Also, wire catches 24 and 25 are disposed apart from each other, with the access door 12 therebetween. The wire catches 24 and 25 are hooked parts to catch and engage wiring. The main circuit wiring bundle 22 is engaged in the wire catch 24, extends therefrom toward the inverter device 14, and is connected to the inverter device 14. The control wiring bundle 23 is engaged in the wire catch 25, extends therefrom toward the control device 15, and is connected to the control device 15. In this way, since the main circuit wiring bundle 22 and the control wiring bundle 23 are always separated from each other, the control wiring bundle 23 is less subject to effects of noise caused by the main circuit wiring bundle 22.

This results in less necessity of including a noise filter in the control wiring bundle 23. Specifically, passing the control wiring bundle 23 through numerous ferrite cores arranged in a row becomes unnecessary. Thus bending or extending of the control wiring bundle 23 is not restricted by the ferrite cores. As a result, the control wiring bundle 23 has a greater degree of freedom of behavior at opening and closing of the access door 12, thereby achieving smooth opening and closing of the access door 12.

As described above, the air-conditioning apparatus 1 according to the above embodiment includes the inverter device 14 and the control device 15 on the surface of the access door 12 facing the interior space of the casing 3 and the access door 12 is supported by the casing 3 via the hinge 13 in an openable and closeable manner. Pulling the access door 12 downward of the casing 3 causes the inverter device 14 and the control device 15 to be pulled out of the casing 3, thereby achieving easy access to the inverter device 14 and the control device 15. This facilitates inspection or repair of the inverter device 14 and the control device 15.

The above describes an example in which the air-conditioning apparatus 1 includes two refrigeration cycles, but the air-conditioning apparatus according to the present disclosure is not limited to such two refrigeration cycles. The air-conditioning apparatus according to the present disclosure may include only a single refrigeration cycle.

The above describes an example in which the air-conditioning apparatus 1 includes the four-way valve and switches between cooling and heating operation modes, but the air-conditioning apparatus 1 may be a cooling-only machine without a four-way valve.

The position of the access door 12 in the above air-conditioning apparatus 1 is an example. The access door in the air-conditioning apparatus according to the present disclosure can be anything that allows access from inside a compartment of the railway vehicle to the internal device, and as long as such access is allowed, the location of the access door can be freely selected.

The device to be connected to the inverter device 14 and the control device 15 as illustrated in FIG. 2 is an example. The devices to be connected to the inverter device and the control device included in the air-conditioning apparatus according to the present disclosure are not limited to the devices illustrated in FIG. 2.

The mechanical configuration of the damper 17 illustrated in FIG. 4 is an example and the mechanical configuration of the damper included in the air-conditioning apparatus according to the present disclosure is not limited by the illustration of FIG. 4. The mechanical configuration of the damper included in the air-conditioning apparatus according to the present disclosure is freely selected.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

The invention claimed is:

1. An air-conditioning apparatus to be mounted on a roof of a railway vehicle, the air-conditioning apparatus comprising:
   a casing to store a device included in the air-conditioning apparatus;
   an access door pivotably supported by the casing via a hinge to allow access from inside a compartment of the railway vehicle to the device in the casing;
   a control device to control the air-conditioning apparatus; and
   an inverter device that is controlled by the control device to supply an operational electric current to the air-conditioning apparatus, wherein
   the control device and the inverter device are mounted on a surface of the access door on a side facing an interior space of the casing, and
   main circuit wiring connected to the inverter device and configured for supplying of power and control wiring connected to the control device and configured for sending and receiving of a control signal are disposed apart from each other in the casing, with the access door between the main circuit wiring and the control wiring.

2. The air-conditioning apparatus according to claim 1, wherein
   two wire catches to engage with the wiring are disposed apart from each other in the casing, with the access door between the wire catches,
   the main circuit wiring is engaged in one of the wire catches, extends therefrom toward the inverter device, and is connected to the inverter device, and
   the control wiring is engaged in another one of the wire catches, extends therefrom toward the control device, and is connected to the control device.

3. The air-conditioning apparatus according to claim 2, wherein
   the inverter device is fixed to the access door, and
   the control device is pivotably supported by the inverter device via the hinge.

4. The air-conditioning apparatus according to claim 2, further comprising:
   a damper bridged between the casing and the access door and configured to suppress pivotal movement around the hinge of the access door.

5. The air-conditioning apparatus according to claim 1, wherein
   the inverter device is fixed to the access door, and
   the control device is pivotably supported by the inverter device via the hinge.

6. The air-conditioning apparatus according to claim 1, further comprising:
   a damper bridged between the casing and the access door and configured to suppress pivotal movement around the hinge of the access door.

* * * * *